(12) United States Patent
Palmateer

(10) Patent No.: US 7,916,103 B2
(45) Date of Patent: Mar. 29, 2011

(54) SYSTEM AND METHOD FOR DISPLAY DEVICE WITH END-OF-LIFE PHENOMENA

(75) Inventor: Lauren Palmateer, San Francisco, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 1714 days.

(21) Appl. No.: 11/102,543

(22) Filed: Apr. 8, 2005

(65) Prior Publication Data

US 2006/0077524 A1    Apr. 13, 2006

Related U.S. Application Data

(60) Provisional application No. 60/613,485, filed on Sep. 27, 2004.

(51) Int. Cl.
*G02B 26/00* (2006.01)

(52) U.S. Cl. .............. 345/85; 345/204; 345/84; 345/86; 73/40.7; 116/200

(58) Field of Classification Search .............. 345/84–86; 73/40.7; 116/200
See application file for complete search history.

(56) References Cited

U.S. PATENT DOCUMENTS

| | | | |
|---|---|---|---|
| 2,534,846 A | 12/1950 | Ambrose et al. | |
| 3,439,973 A | 4/1969 | Paul et al. | |
| 3,443,854 A | 5/1969 | Weiss | |
| 3,653,741 A | 4/1972 | Marks | |
| 3,656,836 A | 4/1972 | de Cremoux et al. | |
| 3,813,265 A | 5/1974 | Marks | |
| 3,955,880 A | 5/1976 | Lierke | |
| 4,036,360 A | 7/1977 | Deffeyes | |
| 4,074,480 A | 2/1978 | Burton | |
| 4,099,854 A | 7/1978 | Decker et al. | |
| 4,150,570 A * | 4/1979 | Fuller ........................ 73/335.01 |
| 4,228,437 A | 10/1980 | Shelton | |
| 4,377,324 A | 3/1983 | Durand et al. | |
| 4,389,096 A | 6/1983 | Hori et al. | |
| 4,403,248 A | 9/1983 | te Velde | |
| 4,431,691 A | 2/1984 | Greenlee | |
| 4,441,791 A | 4/1984 | Hornbeck | |

(Continued)

FOREIGN PATENT DOCUMENTS

EP    0 667 548    8/1995

(Continued)

OTHER PUBLICATIONS

Extended European Search Report for App. No. 05255707.1, dated Nov. 8, 2008.

(Continued)

*Primary Examiner* — Sumati Lefkowitz
*Assistant Examiner* — Grant D Sitta
(74) *Attorney, Agent, or Firm* — Knobbe, Martens, Olson & Bear LLP

(57) ABSTRACT

Systems and methods of displaying an end-of-life image on an electronic display are disclosed. An end-of-life image is displayed on a MEMS display device in the presence of sufficient water vapor and without continued activation of the display. The image can he displayed in response to user input, in response to detection of a predefined level of water vapor within the display package, according to a prestored lifetime of the device, or according to the natural expiration of the lifetime of the display device and packaging.

25 Claims, 12 Drawing Sheets

U.S. PATENT DOCUMENTS

| | | |
|---|---|---|
| 4,445,050 A | 4/1984 | Marks |
| 4,459,182 A | 7/1984 | te Velde |
| 4,482,213 A | 11/1984 | Piliavin et al. |
| 4,500,171 A | 2/1985 | Penz et al. |
| 4,519,676 A | 5/1985 | te Velde |
| 4,531,126 A | 7/1985 | Sadones |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,662,746 A | 5/1987 | Hornbeck |
| 4,663,083 A | 5/1987 | Marks |
| 4,681,403 A | 7/1987 | te Velde et al. |
| 4,710,732 A | 12/1987 | Hornbeck |
| 4,748,366 A | 5/1988 | Taylor |
| 4,786,128 A | 11/1988 | Birnbach |
| 4,790,635 A | 12/1988 | Apsley |
| 4,856,863 A | 8/1989 | Sampsell et al. |
| 4,954,789 A | 9/1990 | Sampsell |
| 4,956,619 A | 9/1990 | Hornbeck |
| 4,977,009 A | 12/1990 | Anderson et al. |
| 4,982,184 A | 1/1991 | Kirkwood |
| 5,018,256 A | 5/1991 | Hornbeck |
| 5,022,745 A | 6/1991 | Zahowski et al. |
| 5,028,939 A | 7/1991 | Hornbeck et al. |
| 5,037,173 A | 8/1991 | Sampsell et al. |
| 5,044,736 A | 9/1991 | Jaskie et al. |
| 5,061,049 A | 10/1991 | Hornbeck |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,142,405 A | 8/1992 | Hornbeck |
| 5,142,414 A | 8/1992 | Koehler |
| 5,153,771 A | 10/1992 | Link et al. |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,244,707 A | 9/1993 | Shores |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,296,950 A | 3/1994 | Lin et al. |
| 5,304,419 A | 4/1994 | Shores |
| 5,305,640 A | 4/1994 | Boysel et al. |
| 5,311,360 A | 5/1994 | Bloom et al. |
| 5,312,513 A | 5/1994 | Florence et al. |
| 5,323,002 A | 6/1994 | Sampsell et al. |
| 5,325,116 A | 6/1994 | Sampsell |
| 5,327,286 A | 7/1994 | Sampsell et al. |
| 5,331,454 A | 7/1994 | Hornbeck |
| 5,339,116 A | 8/1994 | Urbanus et al. |
| 5,365,283 A | 11/1994 | Doherty et al. |
| 5,381,253 A | 1/1995 | Sharp et al. |
| 5,401,983 A | 3/1995 | Jokerst et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,459,610 A | 10/1995 | Bloom et al. |
| 5,461,411 A | 10/1995 | Florence et al. |
| 5,489,952 A | 2/1996 | Gove et al. |
| 5,497,172 A | 3/1996 | Doherty et al. |
| 5,497,197 A | 3/1996 | Gove et al. |
| 5,499,062 A | 3/1996 | Urbanus |
| 5,500,635 A | 3/1996 | Mott |
| 5,500,761 A | 3/1996 | Goossen et al. |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,688 A | 6/1996 | Boysel et al. |
| 5,535,047 A | 7/1996 | Hornbeck |
| 5,548,301 A | 8/1996 | Kornher et al. |
| 5,551,293 A | 9/1996 | Boysel et al. |
| 5,552,924 A | 9/1996 | Tregilgas |
| 5,563,398 A | 10/1996 | Sampsell |
| 5,567,334 A | 10/1996 | Baker et al. |
| 5,570,135 A | 10/1996 | Gove et al. |
| 5,579,149 A | 11/1996 | Moret et al. |
| 5,581,272 A | 12/1996 | Conner et al. |
| 5,583,688 A | 12/1996 | Hornbeck |
| 5,589,852 A | 12/1996 | Thompson et al. |
| 5,591,379 A | 1/1997 | Shores |
| 5,597,736 A | 1/1997 | Sampsell |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,619,059 A | 4/1997 | Li et al. |
| 5,619,365 A | 4/1997 | Rhoades et al. |
| 5,619,366 A | 4/1997 | Rhoads et al. |
| 5,636,052 A | 6/1997 | Arney et al. |
| 5,646,768 A | 7/1997 | Kaeriyama |
| 5,650,881 A | 7/1997 | Hornbeck |
| 5,654,741 A | 8/1997 | Sampsell et al. |
| 5,657,099 A | 8/1997 | Doherty et al. |
| 5,659,374 A | 8/1997 | Gale, Jr. et al. |
| 5,665,997 A | 9/1997 | Weaver et al. |
| 5,703,710 A | 12/1997 | Brinkman et al. |
| 5,710,656 A | 1/1998 | Goosen |
| 5,739,945 A | 4/1998 | Tayebati |
| 5,745,193 A | 4/1998 | Urbanus et al. |
| 5,745,281 A | 4/1998 | Yi et al. |
| 5,771,116 A | 6/1998 | Miller et al. |
| 5,777,705 A | 7/1998 | Pierson et al. |
| 5,784,190 A | 7/1998 | Worley |
| 5,784,212 A | 7/1998 | Hornbeck |
| 5,815,141 A | 9/1998 | Phares |
| 5,818,095 A | 10/1998 | Sampsell |
| 5,825,528 A | 10/1998 | Goosen |
| 5,835,255 A | 11/1998 | Miles |
| 5,842,088 A | 11/1998 | Thompson |
| 5,853,662 A | 12/1998 | Watanabe |
| 5,875,011 A | 2/1999 | Pierson et al. |
| 5,912,758 A | 6/1999 | Knipe et al. |
| 5,936,758 A | 8/1999 | Fisher et al. |
| 5,939,785 A | 8/1999 | Klonis et al. |
| 5,986,796 A | 11/1999 | Miles |
| 6,028,690 A | 2/2000 | Carter et al. |
| 6,038,056 A | 3/2000 | Florence et al. |
| 6,040,937 A | 3/2000 | Miles |
| 6,049,317 A | 4/2000 | Thompson et al. |
| 6,055,090 A * | 4/2000 | Miles .................... 359/291 |
| 6,061,075 A | 5/2000 | Nelson et al. |
| 6,099,132 A | 8/2000 | Kaeriyama |
| 6,113,239 A | 9/2000 | Sampsell et al. |
| 6,147,790 A * | 11/2000 | Meier et al. ............ 359/291 |
| 6,160,833 A | 12/2000 | Floyd et al. |

| | | |
|---|---|---|
| 6,180,428 B1 | 1/2001 | Peeters et al. |
| 6,201,633 B1 | 3/2001 | Peeters et al. |
| 6,232,936 B1 | 5/2001 | Gove et al. |
| 6,238,755 B1 | 5/2001 | Harvey et al. |
| 6,262,696 B1 | 7/2001 | Seraphim et al. |
| 6,282,010 B1 | 8/2001 | Sulzbach et al. |
| 6,295,154 B1 | 9/2001 | Laor et al. |
| 6,323,982 B1 | 11/2001 | Hornbeck |
| 6,447,126 B1 | 9/2002 | Hornbeck |
| 6,465,355 B1 | 10/2002 | Horsley |
| 6,466,358 B2 | 10/2002 | Tew |
| 6,473,274 B1 | 10/2002 | Maimone et al. |
| 6,480,177 B2 | 11/2002 | Doherty et al. |
| 6,496,122 B2 | 12/2002 | Sampsell |
| 6,545,335 B1 | 4/2003 | Chua et al. |
| 6,548,908 B2 | 4/2003 | Chua et al. |
| 6,549,338 B1 | 4/2003 | Wolverton et al. |
| 6,552,840 B2 | 4/2003 | Knipe |
| 6,574,033 B1 | 6/2003 | Chui et al. |
| 6,589,625 B1 | 7/2003 | Kothari et al. |
| 6,600,201 B2 | 7/2003 | Hartwell et al. |
| 6,606,175 B1 | 8/2003 | Sampsell et al. |
| 6,625,047 B2 | 9/2003 | Coleman, Jr. |
| 6,630,786 B2 | 10/2003 | Cummings et al. |
| 6,632,698 B2 | 10/2003 | Ives |
| 6,643,069 B2 | 11/2003 | Dewald |
| 6,650,455 B2 | 11/2003 | Miles |
| 6,666,561 B1 | 12/2003 | Blakley |
| 6,674,562 B1 | 1/2004 | Miles |
| 6,680,792 B2 | 1/2004 | Miles |
| 6,710,908 B2 | 3/2004 | Miles et al. |
| 6,741,377 B2 | 5/2004 | Miles |
| 6,741,384 B1 | 5/2004 | Martin et al. |
| 6,741,503 B1 | 5/2004 | Farris et al. |
| 6,747,785 B2 | 6/2004 | Chen et al. |
| 6,775,174 B2 | 8/2004 | Huffman et al. |
| 6,778,155 B2 | 8/2004 | Doherty et al. |
| 6,794,119 B2 | 9/2004 | Miles |
| 6,811,267 B1 | 11/2004 | Allen et al. |
| 6,819,469 B1 | 11/2004 | Koba |
| 6,822,628 B2 | 11/2004 | Dunphy et al. |
| 6,829,132 B2 | 12/2004 | Martin et al. |
| 6,839,467 B2 * | 1/2005 | Bruna et al. ................. 382/239 |
| 6,853,129 B1 | 2/2005 | Cummings et al. |
| 6,855,610 B2 | 2/2005 | Tung et al. |
| 6,859,218 B1 | 2/2005 | Luman et al. |
| 6,861,277 B1 | 3/2005 | Monroe et al. |
| 6,862,022 B2 | 3/2005 | Slupe |
| 6,862,029 B1 | 3/2005 | D'Souza et al. |
| 6,867,896 B2 | 3/2005 | Miles |
| 6,870,581 B2 | 3/2005 | Li et al. |
| 7,123,216 B1 | 10/2006 | Miles |
| 2001/0003487 A1 | 6/2001 | Miles |
| 2002/0015215 A1 | 2/2002 | Miles |
| 2002/0024711 A1 | 2/2002 | Miles et al. |
| 2002/0075555 A1 | 6/2002 | Miles |
| 2002/0126364 A1 | 9/2002 | Miles |
| 2003/0043157 A1 | 3/2003 | Miles |
| 2003/0054588 A1 | 3/2003 | Patel et al. |
| 2003/0062186 A1 | 4/2003 | Boroson et al. |
| 2003/0072070 A1 | 4/2003 | Miles |
| 2003/0202264 A1 | 10/2003 | Weber et al. |
| 2003/0202265 A1 | 10/2003 | Reboa et al. |
| 2003/0202266 A1 | 10/2003 | Ring et al. |
| 2004/0051929 A1 | 3/2004 | Sampsell et al. |
| 2004/0058532 A1 | 3/2004 | Miles et al. |
| 2004/0061492 A1 | 4/2004 | Lopes et al. |
| 2004/0080807 A1 | 4/2004 | Chen et al. |
| 2004/0145049 A1 | 7/2004 | McKinnell et al. |
| 2004/0147056 A1 | 7/2004 | McKinnell et al. |
| 2004/0160143 A1 | 8/2004 | Shreeve et al. |
| 2004/0174583 A1 | 9/2004 | Chen et al. |
| 2004/0179281 A1 | 9/2004 | Reboa |
| 2004/0212026 A1 | 10/2004 | Van Brocklin et al. |
| 2004/0217378 A1 | 11/2004 | Martin et al. |
| 2004/0217919 A1 | 11/2004 | Pichl et al. |
| 2004/0218251 A1 | 11/2004 | Piehl et al. |
| 2004/0218334 A1 | 11/2004 | Martin et al. |
| 2004/0218341 A1 | 11/2004 | Martin et al. |
| 2004/0227493 A1 | 11/2004 | Van Brocklin et al. |
| 2004/0240032 A1 | 12/2004 | Miles |
| 2004/0240138 A1 | 12/2004 | Martin et al. |
| 2004/0245588 A1 | 12/2004 | Nikkel et al. |
| 2004/0263944 A1 | 12/2004 | Miles et al. |
| 2005/0001828 A1 | 1/2005 | Martin et al. |
| 2005/0038950 A1 | 2/2005 | Adelmann |
| 2005/0057442 A1 | 3/2005 | Way |
| 2005/0068583 A1 | 3/2005 | Gutkowski et al. |
| 2005/0069209 A1 | 3/2005 | Damera-Venkata et al. |
| 2005/0223827 A1 * | 10/2005 | Walker ..................... 73/865.9 |
| 2006/0066935 A1 | 3/2006 | Cummings et al. |

FOREIGN PATENT DOCUMENTS

| | | |
|---|---|---|
| EP | 0 980 014 | 2/2000 |
| JP | 02-068513 | 3/1990 |
| JP | 03-199920 | 8/1991 |
| WO | WO9530924 | 11/1995 |
| WO | WO9717628 | 5/1997 |
| WO | WO 99/41732 | 8/1999 |
| WO | WO9952006 A2 | 10/1999 |
| WO | WO9952006 A3 | 10/1999 |
| WO | WO 2005/066596 | 7/2001 |
| WO | WO03007049 A1 | 1/2003 |
| WO | WO03069413 A1 | 8/2003 |
| WO | WO03073151 A1 | 9/2003 |
| WO | WO2004006003 A1 | 1/2004 |
| WO | WO2004026757 A2 | 4/2004 |

OTHER PUBLICATIONS

Akasaka, "Three-Dimensional IC Trends", Proceedings of IEEE, vol. 74, No. 12, pp. 1703-1714, (Dec. 1986).

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani K., et al., "Surface micromachined tuneable interferometer array," Sensors and Actuators, pp. 17-23. (1994).

Conner, "Hybrid Color Display Using Optical Interference Filter Array," SID Digest, pp. 577-580 (1993).

Goossen et al., "Possible Display Applications of the Silicon Mechanical Anti-Reflection Switch," Society for Information Display (1994).

Goossen et al., "Silicon Modulator Based on Mechanically-Active Anti-Reflection Layer with 1Mbit/sec Capability for Fiber-in-the-Loop Applications," IEEE Photonics Technology Letters, pp. 1119-1121 (Sep. 1994).

Gosch, "West Germany Grabs the Lead in X-Ray Lithography," Electronics pp. 78-80 (Feb. 5, 1987).

Howard et al., "Nanometer-Scale Fabrication Techniques", VLSI Electronics: Microstructure Science, vol. 5, pp. 145-153 and pp. 166-173 (1982).

Jackson "Classical Electrodynamics", John Wiley & Sons Inc., pp. 568-573. (date unknown).

Jerman et al., "A Miniature Fabry-Perot Interferometer with a Corrugated Silicon Diaphragm Support", (1988).

Johnson "Optical Scanners", Microwave Scanning Antennas, vol. 1, p. 251-261, (1964).

Light over Matter, Circle No. 36 (Jun. 1993).

Miles, Mark, W., "A New Reflective FPD Technology Using Interferometric Modulation", The Proceedings of the Society for Information Display (May 11-16, 1997).

Newsbreaks, "Quantum-trench devices might operate at terahertz frequencies", Laser Focus World (May 1993).

Oliner et al., "Radiating Elements and Mutual Coupling", Microwave Scanning Antennas, vol. 2, pp. 131-141, (1966).

Raley et al., "A Fabry-Perot Microinterferometer for Visible Wavelengths", IEEE Solid-State Sensor and Actuator Workshop, Jun. 1992, Hilton Head, SC.

Sperger et al., "High Performance Patterned All-Dielectric Interference Colour Filter for Display Applications", SID Digest, pp. 81-83, (1994).

Stone, "Radiation and Optics, An Introduction to the Classical Theory", McGraw-Hill, pp. 340-343, (1963).

Walker, et al., "Electron-beam-tunable Interference Filter Spatial Light Modulator", Optics Letters vol. 13, No. 5, pp. 345-347, (May 1988).

Winton, John M., "A novel way to capture solar energy", Chemical Week, (May 1985).

Wu, "Design of a Reflective Color LCD Using Optical Interference Reflectors", ASIA Display '95, pp. 929-931, (Oct. 1995).

Partial European Search Report for App. No. 05255707.1, dated May 7, 2008.

Office Action in Chinese App. No. 200510105042.2 dated Mar. 28, 2008.

Anonymous, Stiction Switch, Research Disclosure, Jul. 2004, vol. 483, No. 127, p. 483127, Kenneth Mason Publications, Westbourne, GB.

Moraja, et al., Advanced Getter Solutions at Wafer Level to Assure High Reliability to the last Generations MEMS, IEEE Reliability Physics Symposium Proceedings, 2003, pp. 458-459.

Office Action in Chinese App. No. 200510105042.2 dated Apr. 10, 2009.

Ashurst, R.W., et al. "Vapor-Phase Anti-Stiction Coatings for MEMS" IEEE transactions o Device and materials reliability vol. 3, No. 4 Dec. 2003, pp. 173-178.

Maboudian, R., et al. "Self-Assembled Monolayers as Anti-stiction coatings for MEMS: characteristics and recent developments" Sensors and Actuators 82, (2000) pp. 219-223.

European Search Report for EP application No. 05255675.0, 2006.

European Search Report for EP application No. 05255679, 2006.

\* cited by examiner

|  | Column Output Signals | |
|---|---|---|
|  | $+V_{bias}$ | $-V_{bias}$ |
| Row Output Signals   0 | Stable | Stable |
| $+\Delta V$ | Release | Actuate |
| $-\Delta V$ | Actuate | Release |

SYSTEM AND METHOD FOR DISPLAY DEVICE WITH END-OF-LIFE PHENOMENA

CROSS REFERENCE TO RELATED APPLICATIONS

This application claims priority to U.S. Provisional Patent Application 60/613,485 entitled "SYSTEM AND METHOD FOR DISPLAY DEVICE WITH END-OF-LIFE PHENOMENA AND RELAXED CONSTRAINT FOR HUMIDITY SENSITIVITY" and filed on Sep. 27, 2004. The disclosure of the above-described filed application is hereby incorporated by reference in its entirety.

BACKGROUND

1. Field of the Invention

The field of the invention relates to microelectromechanical systems (MEMS), and more particularly to a method of and device for displaying an end-of-life message on a MEMS display device.

2. Description of the Related Art

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. An interferometric modulator may comprise a pair of conductive plates, one or both of which may be transparent and/or reflective in whole or part and capable of relative motion upon application of an appropriate electrical signal. One plate may comprise a stationary layer deposited on a substrate, the other plate may comprise a metallic membrane separated from the stationary layer by an air gap. Such devices have a wide range of applications, and it would be beneficial in the art to utilize and/or modify the characteristics of these types of devices so that their features can be exploited in improving existing products and creating new products that have not yet been developed.

MEMS display devices have a reduced sensitivity to moisture and oxygen during both assembly and operation as compared to conventional organic light emitting diode (OLED) displays. Unlike OLEDs, the MEMS display can be packaged under ambient conditions and is functional when the relative humidity in the display package can be as high as 10%. The relaxed constraint for humidity sensitivity allows the MEMS display to be manipulated to generate an end-of-life image when subject to excessive moisture as opposed to total device failure in OLEDs.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

One embodiment of a method of displaying an image on a microelectromechanical system (MEMS) display comprises contacting a MEMS display with water vapor, activating the display in response to user input, and displaying a predefined image on the display in response to activation, wherein the image is displayed without continued activation. The predefined image may comprise at least one of a user selected image and a prestored image. In some embodiments, displaying the predefined image comprises displaying at least one of text and one or more graphics. In certain embodiments, contacting the MEMS display with water vapor comprises creating an opening in a packaging structure of the MEMS display to ambient conditions.

Another embodiment of a method of displaying an image on a MEMS display comprises detecting water vapor above a predefined level in a MEMS display package, activating the display in response to detection of water vapor above the predefined level, and displaying a predefined image on the display in response to activation. In some embodiments, the image is displayed without continued activation. In some embodiments, detecting water vapor above the predefined level comprises detecting water vapor above a plurality of predefined levels, and displaying a predefined image comprises displaying a different predefined image in response to detection of water vapor above each of the plurality of predefined levels. The predefined image may comprise at least one of text and one or more graphics, and method of Claim 5, wherein the predefined image may comprise at least one of a user selected image and a prestored image. In certain embodiments, the MEMS display device is configured to store information input by a user to a flash memory in response to sensing water vapor above a predefined level. In some embodiments, the MEMS display is an interferometric modulator display.

One embodiment of a MEMS display device comprises a MEMS display encapsulated within a package, and a water vapor sensor within the package and coupled to the MEMS display, wherein the water vapor sensor is configured to sense water vapor in the package above a predefined level and generate the display of a predefined image in response thereto. The predefined image may comprise at least one of text and one or more graphics, and the predefined image may comprise at least one of a user selected image and a prestored image. In some embodiments, the water vapor sensor is configured to sense water vapor in the package above a plurality of predefined levels and generate the display of a different predefined image in response to sensing the presence of water vapor in the package above each of the predefined levels. In some embodiments, at least a first predefined image displayed in response to sensing a first predefined level of water vapor indicates a remaining lifetime of the display device. In certain embodiments, the MEMS display is an interferometric modulator display.

One embodiment of a method of displaying an image on a MEMS display comprising a plurality of display elements comprises storing data representing a predetermined lifetime of the MEMS display in memory coupled to control circuitry configured to control operation of the display, determining when the predetermined lifetime of the MEMS display has expired, and displaying a predefined image in response to determining that the predetermined lifetime of the MEMS display has expired. The predefined image may comprise at least one of text and one or more graphics, and the predefined image may comprise at least one of a user selected image and a prestored image. In certain embodiments, the MEMS display is an interferometric modulator display.

The method of displaying an image may further comprise determining when the current life of the MEMS display is within a predefined range of the predetermined lifetime, and displaying a warning image in response to determining that the current life the MEMS display is within the predefined range.

One embodiment of a MEMS display device configured to display a predefined image at the end of an operational lifetime comprises a plurality of display elements each comprising a mechanical layer and a substantially fixed conductive layer separated by a cavity in an undriven state, wherein a cavity height for a plurality of preselected display elements is less than a cavity height for unselected display elements, such that the mechanical layers of the plurality of preselected display elements remain in contact with the substantially fixed conductive layers of the plurality of preselected display elements in the presence of sufficient water vapor such that a predefined image is displayed according to the preselected display elements. The predefined image may comprise at least one of text and one or more graphics.

Another embodiment of a MEMS display device configured to display a predefined image at the end of an operational lifetime comprises a substrate including a MEMS device formed thereon, wherein the MEMS device comprises a plurality of MEMS elements configured to remain in an active state in the presence of sufficient water vapor, a backplane, a seal, positioned between the backplane and the substrate, wherein the MEMS device is encapsulated within the substrate and the backplane, and a desiccant deposited on the backplane proximate the MEMS device, wherein the desiccant comprises one or more preselected areas with substantially less desiccant than unselected areas, such that a plurality of the MEMS elements proximate the predefined areas of the desiccant remain in an active state in the presence of less water vapor than a plurality of the MEMS elements proximate the unselected areas of the desiccant.

One embodiment of a method of displaying an image on a MEMS display comprises applying a temperature differential to selective areas of a MEMS display package, and displaying an image on the display corresponding to the selective areas. In some embodiments, the temperature differential is applied with a stylus. Applying the temperature differential may comprise applying a reduced temperature, or applying an increased temperature. The method may further comprise detecting water vapor above a predefined level in the MEMS display package, and notifying a user in response to said detection. In some embodiments, the method further comprises activating a plurality of MEMS elements of the MEMS display.

DETAILED DESCRIPTION OF THE PREFERRED EMBODIMENTS

A plurality of embodiments of MEMS display devices configured to display an end-of-life image, and methods of displaying an end-of-life image in a MEMS display device are described below. Some methods comprise user activation of the display such that a predefined, end-of-life image is displayed when the display is intentionally exposed to water vapor. In one embodiment, exposure to water vapor followed by activation of a switch or combination of buttons activates predefined image which remains displayed in the absence of any further input from the user. In certain embodiments, the MEMS display device is configured to detect the level of water vapor within the display device package and activate the display such that the predefined image is displayed. Additional embodiments of MEMS display devices and methods of displaying an end-of-life image are discussed in more detail below in reference to FIGS. 8-11.

The following detailed description is directed to certain specific embodiments of the invention. However, the invention can be embodied in a multitude of different ways. In this description, reference is made to the drawings wherein like parts are designated with like numerals throughout. As will be apparent from the following description, the invention may be implemented in any device that is configured to display an image, whether in motion (e.g., video) or stationary (e.g., still image), and whether textual or pictorial. More particularly, it is contemplated that the invention may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
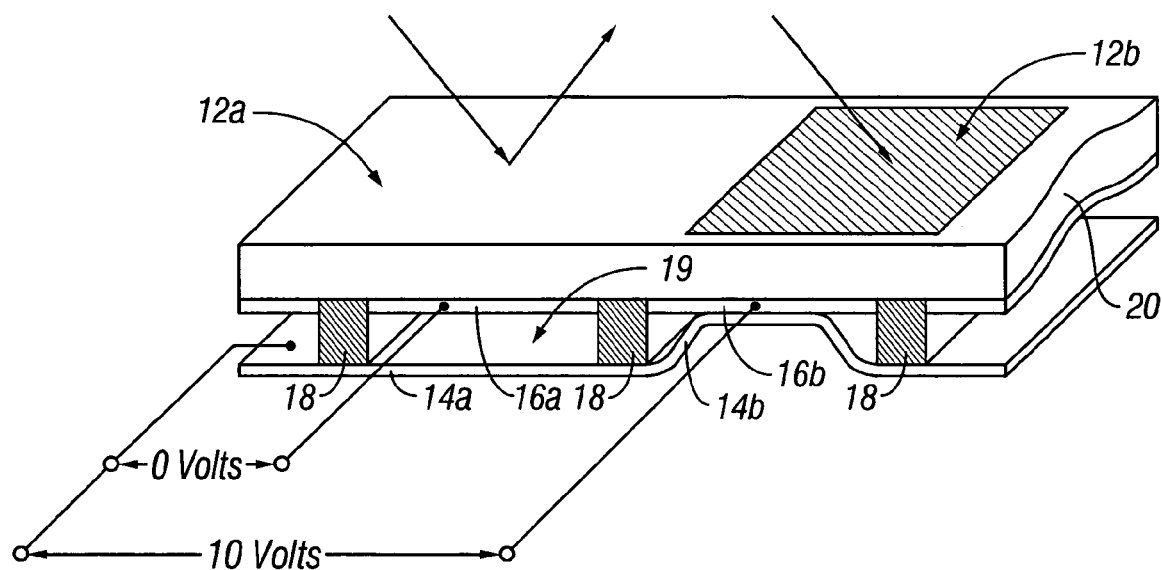
FIG. 1 is an isometric view depicting a portion of one embodiment of an interferometric modulator display in which a movable reflective layer of a first interferometric modulator is in a released position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the released state, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a released position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers are separated from the fixed metal layers by a defined air gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
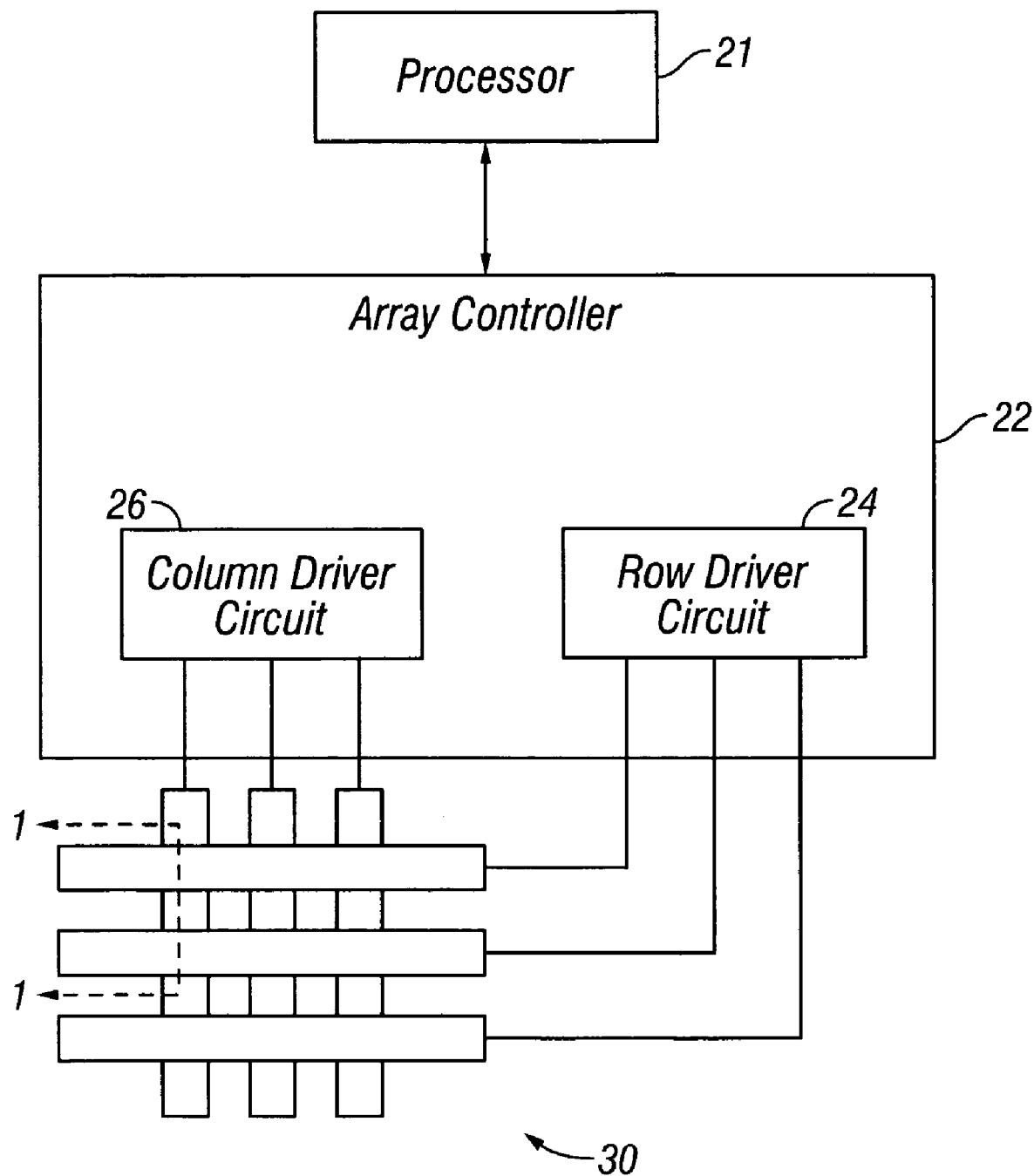
FIG. 2 is a system block diagram illustrating one embodiment of an electronic device incorporating a 3×3 interferometric modulator display.

FIGS. 2 through 5 illustrate one exemplary process and system for using an array of interferometric modulators in a display application. FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a pixel array 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the released state to the actuated state. However, when the voltage is reduced from that value, the movable layer maintains its state as the voltage drops back below 10 volts. In the exemplary embodiment of FIG. 3, the movable layer does not release completely until the voltage drops below 2 volts. There is thus a range of voltage, about 3 to 7 V in the example illustrated in FIG. 3, where there exists a window of applied voltage within which the device is stable in either the released or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be released are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or released pre-existing state. Since each pixel of the interferometric modulator, whether in the actuated or released state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
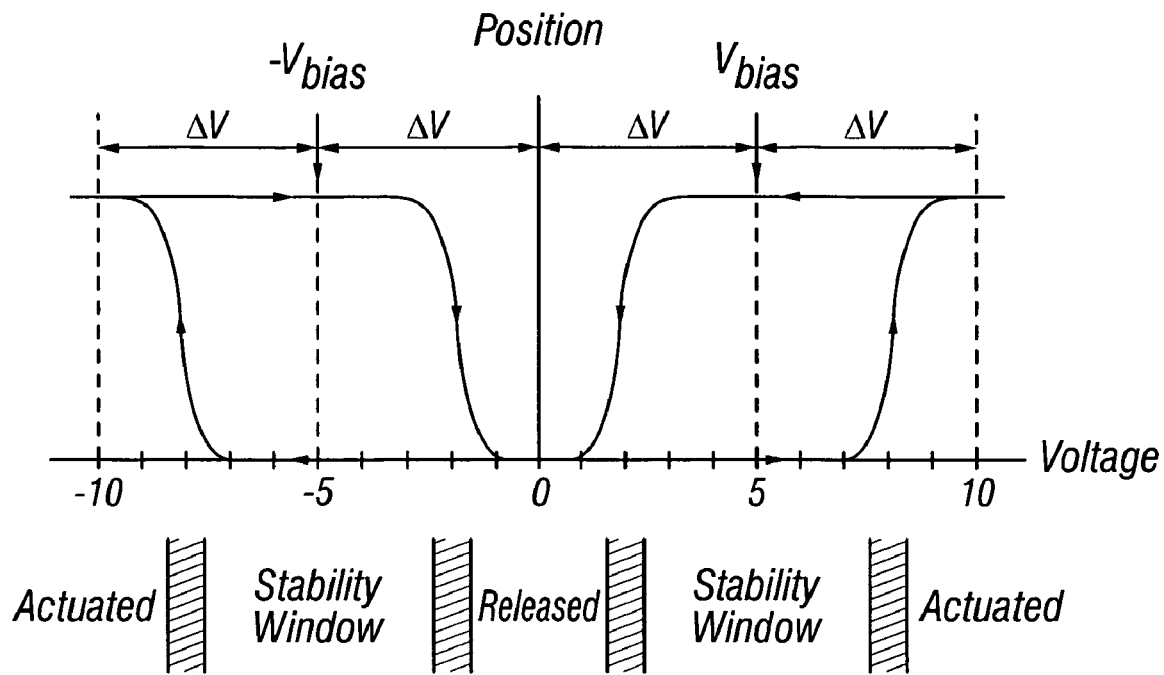
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Releasing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$.

Figure 5A:
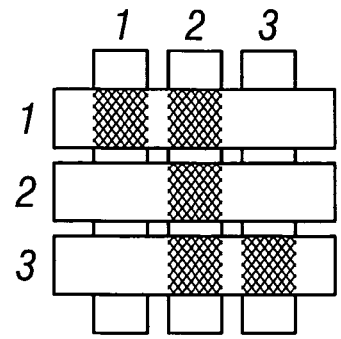
FIGS. 5A and 5B illustrate one exemplary timing diagram for row and column signals that may be used to write a frame of display data to the 3×3 interferometric modulator display of FIG. 2.
Figure 5B:
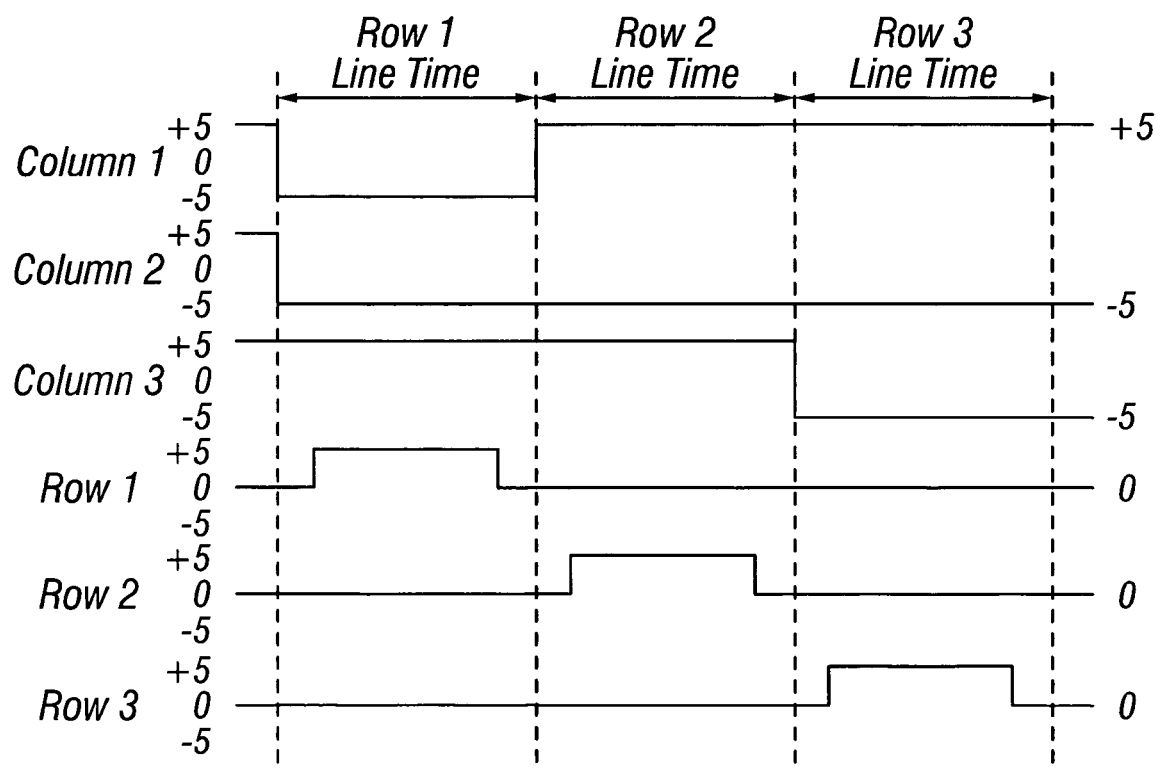

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or released states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and releases the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and release pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the present invention.

Figure 6A:
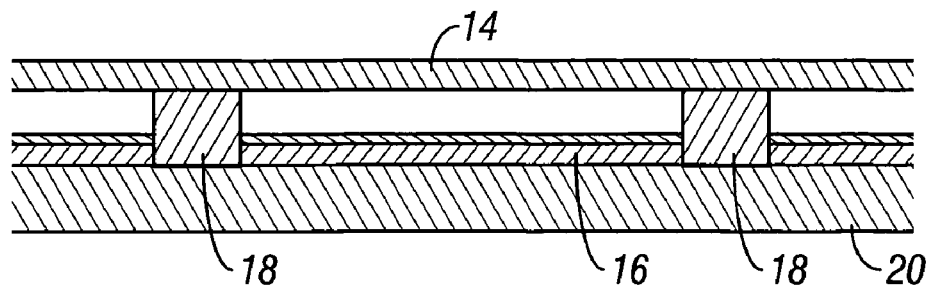
FIG. 6A is a cross section of the device of FIG. 1.
Figure 6B:
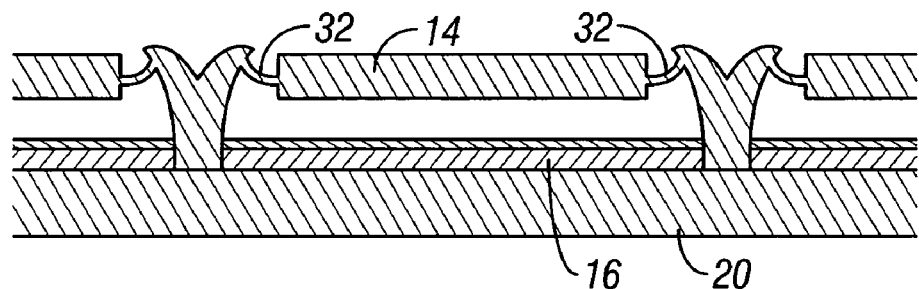
FIG. 6B is a cross section of an alternative embodiment of an interferometric modulator.
Figure 6C:
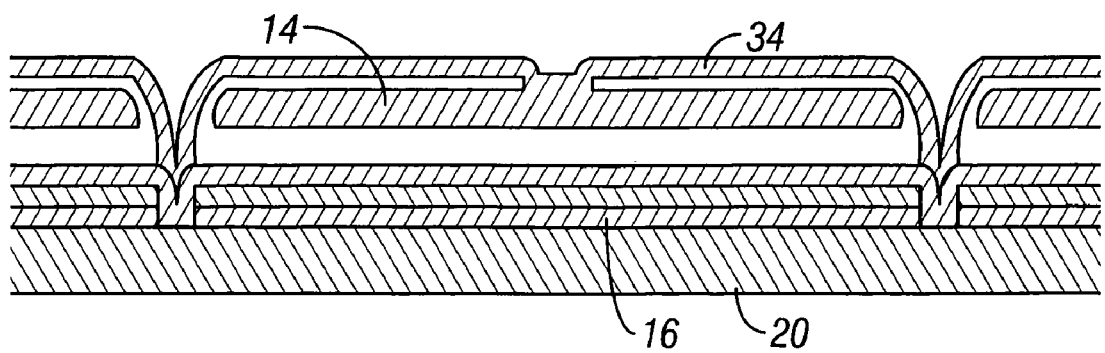
FIG. 6C is a cross section of another alternative embodiment of an interferometric modulator.

The details of the structure of interferometric modulators that operate in accordance with the principles set forth above may vary widely. For example, FIGS. 6A-6C illustrate three different embodiments of the moving mirror structure. FIG. 6A is a cross section of the embodiment of FIG. 1, where a strip of metal material 14 is deposited on orthogonally extending supports 18. In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of well known techniques may be used to produce the above described structures involving a series of material deposition, patterning, and etching steps.

Figure 7:
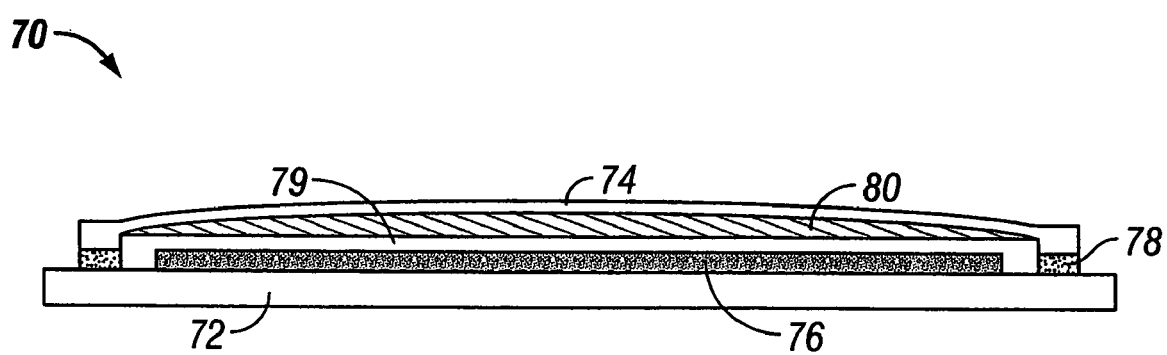
FIG. 7 is a cross section of one embodiment of a packaging structure for a MEMS device.

The moving parts of a MEMS device, such as an interferometric modulator array, preferably have a protected space in which to move. Packaging techniques for a MEMS device will be described in more detail below. A schematic of a basic package structure for a MEMS device, such as an interferometric modulator array, is illustrated in FIG. 7. As shown in FIG. 7, a basic package structure 70 includes a substrate 72 and a backplane cover or "cap" 74, wherein an interferometric modulator array 76 is formed on the substrate 72. This cap 74 is also called a "backplate".

The substrate 72 and the backplane 74 are joined by a seal 78 to form the package structure 70, such that the interferometric modulator array 76 is encapsulated by the substrate 72, backplane 74, and the seal 78. This forms a cavity 79 between the backplane 74 and the substrate 72. The seal 78 may be a non-hermetic seal, such as a conventional epoxy-based adhesive. In other embodiments, the seal 78 may be a polyisobutylene (sometimes called butyl rubber, and other times PIB), o-rings, polyurethane, thin film metal weld, liquid spin-on glass, solder, polymers, or plastics, among other types of seals that may have a range of permeability of water vapor of about 0.2-4.7 g mm/m$^2$kPa day. In still other embodiments, the seal 78 may be a hermetic seal.

In some embodiments, the package structure 70 includes a desiccant 80 configured to reduce moisture within the cavity 79. The skilled artisan will appreciate that a desiccant may not be necessary for a hermetically sealed package, but may be desirable to control moisture resident within the package. In one embodiment, the desiccant 80 is positioned between the interferometric modulator array 76 and the backplane 74. Desiccants may be used for packages that have either hermetic or non-hermetic seals. In packages having a hermetic seal, desiccants are typically used to control moisture resident within the interior of the package. In packages having a non-hermetic seal, a desiccant may be used to control moisture moving into the package from the environment. Generally, any substance that can trap moisture while not interfering with the optical properties of the interferometric modulator array may be used as the desiccant 80. Suitable desiccant materials include, but are not limited to, zeolites, molecular sieves, surface adsorbents, bulk adsorbents, and chemical reactants.

The desiccant 80 may be in different forms, shapes, and sizes. In addition to being in solid form, the desiccant 80 may alternatively be in powder form. These powders may be inserted directly into the package or they may be mixed with an adhesive for application. In an alternative embodiment, the desiccant 80 may be formed into different shapes, such as cylinders or sheets, before being applied inside the package.

The skilled artisan will understand that the desiccant 80 can be applied in different ways. In one embodiment, the desiccant 80 is deposited as part of the interferometric modulator array 76. In another embodiment, the desiccant 80 is applied inside the package 70 as a spray or a dip coat.

The substrate 72 may be a semi-transparent or transparent substance capable of having thin film, MEMS devices built upon it. Such transparent substances include, but are not limited to, glass, plastic, and transparent polymers. The interferometric modulator array 76 may comprise membrane modulators or modulators of the separable type. The skilled artisan will appreciate that the backplane 74 may be formed of any suitable material, such as glass, metal, foil, polymer, plastic, ceramic, or semiconductor materials (e.g., silicon).

The packaging process may be accomplished in a vacuum, pressure between a vacuum up to and including ambient pressure, or pressure higher than ambient pressure. The packaging process may also be accomplished in an environment of varied and controlled high or low pressure during the sealing process. There may be advantages to packaging the interferometric modulator array 76 in a completely dry environment, but it is not necessary. Similarly, the packaging environment may be of an inert gas at ambient conditions. Packaging at ambient conditions allows for a lower cost process and more potential for versatility in equipment choice because the device may be transported through ambient conditions without affecting the operation of the device.

Generally, it is desirable to minimize the permeation of water vapor into the package structure and thus control the environment inside the package structure 70 and hermetically seal it to ensure that the environment remains constant. An example of a hermetic sealing process is disclosed in U.S. Pat. No. 6,589,625, the entirety of which is hereby incorporated by reference. When the humidity within the package exceeds a level beyond which surface tension from the moisture becomes higher than the restoration force of a movable element (not shown) in the interferometric modulator 10, the movable element may become permanently stuck to the surface. If the humidity level is too low, the moisture charges up to the same polarity as the movable element when the element comes into contact with the coated surface.

As noted above, a desiccant may be used to control moisture resident within the package structure 70. However, the need for a desiccant can be reduced or eliminated with the implementation of a hermetic seal 78 to prevent moisture from traveling from the atmosphere into the interior of the package structure 70.

The continued reduction in display device dimensions restricts available methods to manage the environment within the package structure 70 because there is less area to place a desiccant 80 within the package structure 70. The elimination of the need for a desiccant also allows the package structure 70 to be thinner, which is desirable in some embodiments. Typically, in packages containing desiccants, the lifetime expectation of the packaged device may depend on the lifetime of the desiccant. When the desiccant is fully consumed, the interferometric modulator device may fail as sufficient moisture thereafter enters the package structure and damages the interferometric modulator array.

Figure 8:
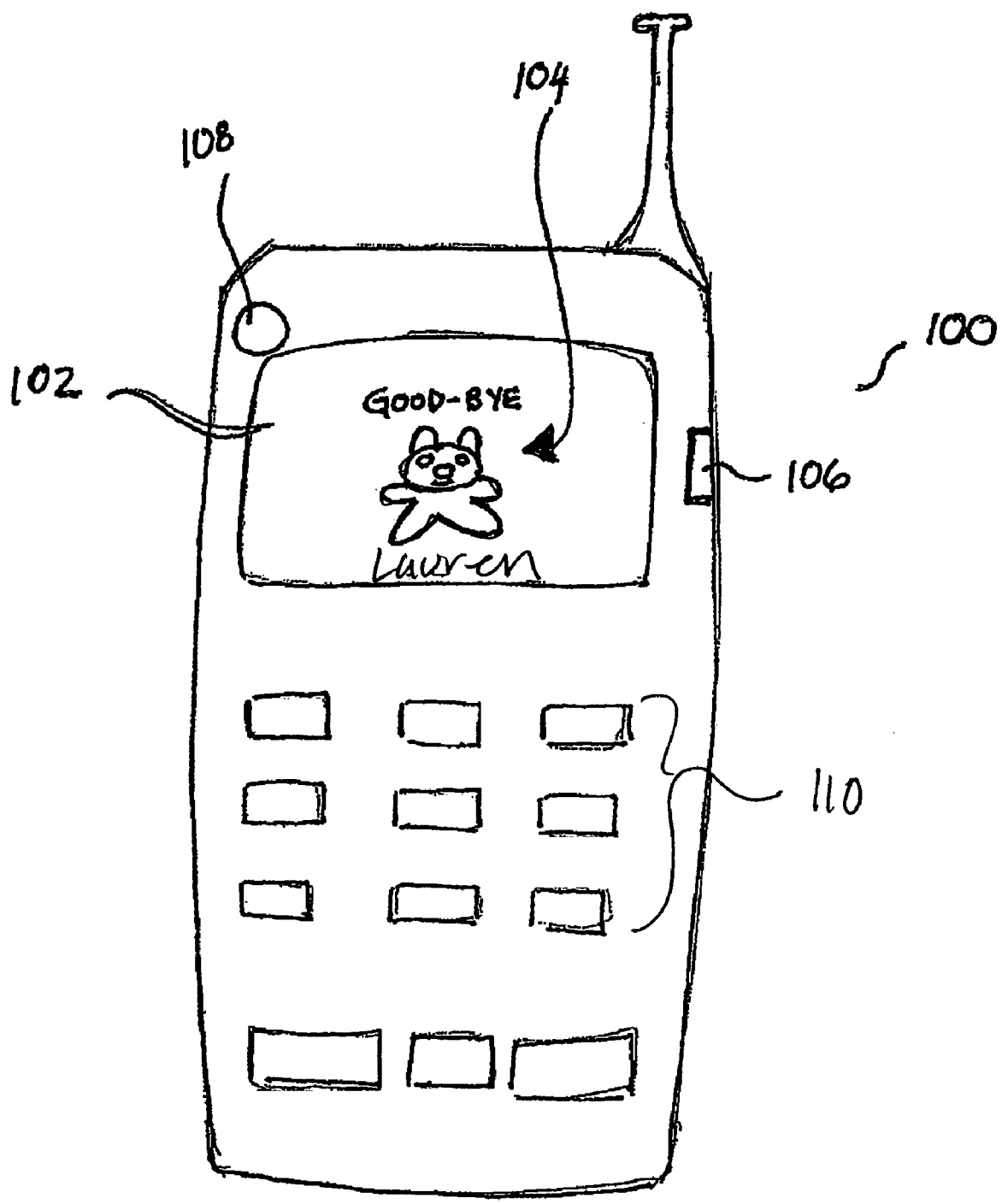
FIG. 8 is a front-view illustration of one embodiment of a wireless telephone handset having an electronic display displaying an end-of-life image.

Embodiments of the invention relate to electronic displays for use in devices such as wireless telephones, personal digital assistants, digital music players, kid phones, and handheld video game players. FIG. 8 illustrates a wireless telephone 100 with a display 102 according to one embodiment. The display 102 is configured to display images including text and graphics, such as telephone numbers, messages, time, date, video game characters and the like.

The display 102 can be any type of display including light emitting diode (LED), organic light emitting diode (OLED), or an interferometric modulator (IMOD) direct view electronic display. As will be described in greater detail below, the display 102 is configured to take advantage of an end-of-life phenomenon that occurs when a sufficient amount of water vapor is present in a packaging structure of the display so as to display an end-of-life image. The end-of-life image can include, for example, a humorous message, a graphic image, a puzzle, or the like to signify that the device is no longer operable. For added consumer interest, the end-of-life phenomenon is preferably different for each device and is not revealed until triggered by one or more pre-determined conditions.

Generally, it is desirable to minimize the permeation of water vapor into the package structure for a display device. In a MEMS device, when the humidity or water vapor within the package exceeds a level beyond which surface tension from the moisture becomes higher than the restoration force of movable elements (or layers, such as the movable layers 14a, 14b illustrated in FIG. 1), the movable layers may become permanently adhered to the surface of an opposed fixed surface (fixed layers 16a, 16b of FIG. 1) of a MEMS element. The presence of excessive water vapor in the MEMS device package enables the activated membranes to remain adhered to the thin film layer, as illustrated in FIG. 1 by movable layer 14b and fixed layer 16b, without continued application of a voltage. As such, a display pixel comprising a MEMS interferometric modulator will remain activated without application of a voltage in the presence of sufficient water vapor. In certain embodiments, the display device utilizes this aspect of a MEMS element to display a substantially permanent end-of-life image on the display.

In certain embodiments, a display device comprises a MEMS interferometric modulator display configured for an end-of-life phenomenon that can be triggered by the presence of water vapor in excess of a predefined amount in the display packaging. In one embodiment, a user of the display device activates the end-of-life phenomenon at any time during the lifetime of the display. This embodiment may be used, for example, as a novelty, wherein the device is intentionally contacted with water and the user then presses an activator button which permanently displays a humorous end-of-life message.

In another embodiment, the display device is configured to detect a predefined level of water vapor in the display package and display an end-of-life image in response to such detection. In yet another embodiment, data representing a predetermined lifetime of the display device is stored in memory, and the device is configured to display an end-of-life image in response to determination of the expiration of the stored lifetime. In an additional embodiment of a display device, preselected elements of the display comprise cavity heights smaller than unselected elements of the display, wherein an end-of-life image is displayed on the display according to the preselected elements when sufficient water vapor is present within the display device package. In yet another embodiment of a display device, the packaging structure of the display device comprises a desiccant deposited on a backplane of the package structure, wherein a reduced amount or no desiccant is deposited in predefined areas. An end-of-life image is displayed on the device according to the display elements proximate the reduced desiccant areas of the package when sufficient water vapor is present in the device packaging structure. Each of these embodiments are discussed in more detail below.

In one embodiment of a MEMS display device, an end-of-life phenomenon is activated by the user. The user can contact the display with water vapor by, for example, placing it in a high humidity environment, such as adjacent to a pot of boiling water, to introduce water vapor into the display device packaging structure. The device reaches its end of life when the water absorption capacity of the desiccant 80 (FIG. 8) has been exceeded, at which time the relative humidity inside the package increases, moving toward equilibrium with the external environment. The water vapor can either enter through the seal 78 of the packaging structure 70 in the case of a semi-hermetic package, or the packaging structure 70 may include an aperture with a plug 108 as shown in FIG. 8, wherein the user removes the plug 108 to intentionally contact the display device with water vapor. In one example, a user can breathe into the packaging structure to contact the display with water vapor.

Following contact of the display device with water vapor, the user can then activate the display via an "end-of-life" switch 106, for example, wherein the display device is configured to display a predefined image 104 on the display in response to such user activation. Specifically, the display device may be configured to apply a predefined voltage to the display in response to user activation of the switch 106. Upon application of the voltage, the movable layers of selected MEMS elements are moved into contact with their respective fixed layer to display the end-of-life image. The excessive moisture in the display causes the movable layers to become permanently adhered to the fixed layers, such that the image remains on the display without continued activation of the display. In one embodiment, the user activates the display for display of the end-of-life image 104 by depressing a predefined combination of keys, buttons, or switches 110 on the device. Through this embodiment, a user can, for example, cause a novelty display to be permanently active.

In some embodiments, the MEMS display device includes a water vapor reservoir within the packaging structure, wherein the reservoir can be activated by the user to release water vapor in the packaging structure and in contact with the MEMS display. In one embodiment, the MEMS display device includes a desiccant holding water or water vapor, wherein the user can release the water or water vapor from the desiccant by applying heat to the desiccant. Heat can be applied to the desiccant, for example, with a heated or hot-tipped stylus.

The predefined end-of-life image 104 may be prestored by the display device manufacturer, distributor, or retailer, for example, and/or the device may be configured for selection or programming of the end-of-life image by the user. In one embodiment, the end-of-life image is customized by the user to include a selected image including at least one of text and graphics. For example, the end-of-life image may include text corresponding to the user's name, such as "GOOD-BYE LAUREN". In the embodiment where the end-of-life image is selectable by a user, the device may include a default end-of-life message which is displayed in the absence of a user selected image or in addition to the image selected by the user.

Figure 9A:
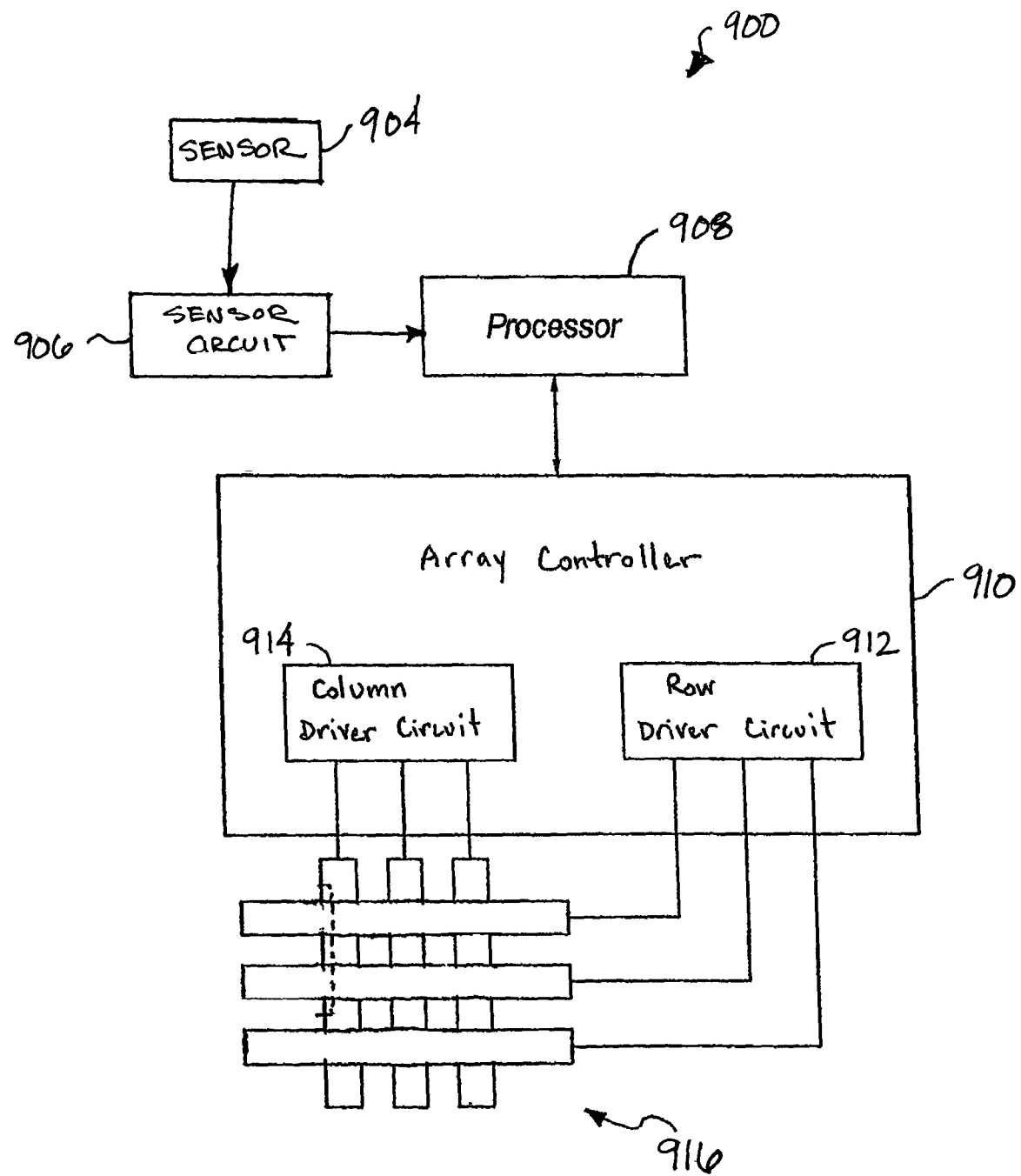
FIG. 9A is a block diagram of a MEMS display device with a water vapor sensor and sensor circuit.
Figure 9B:
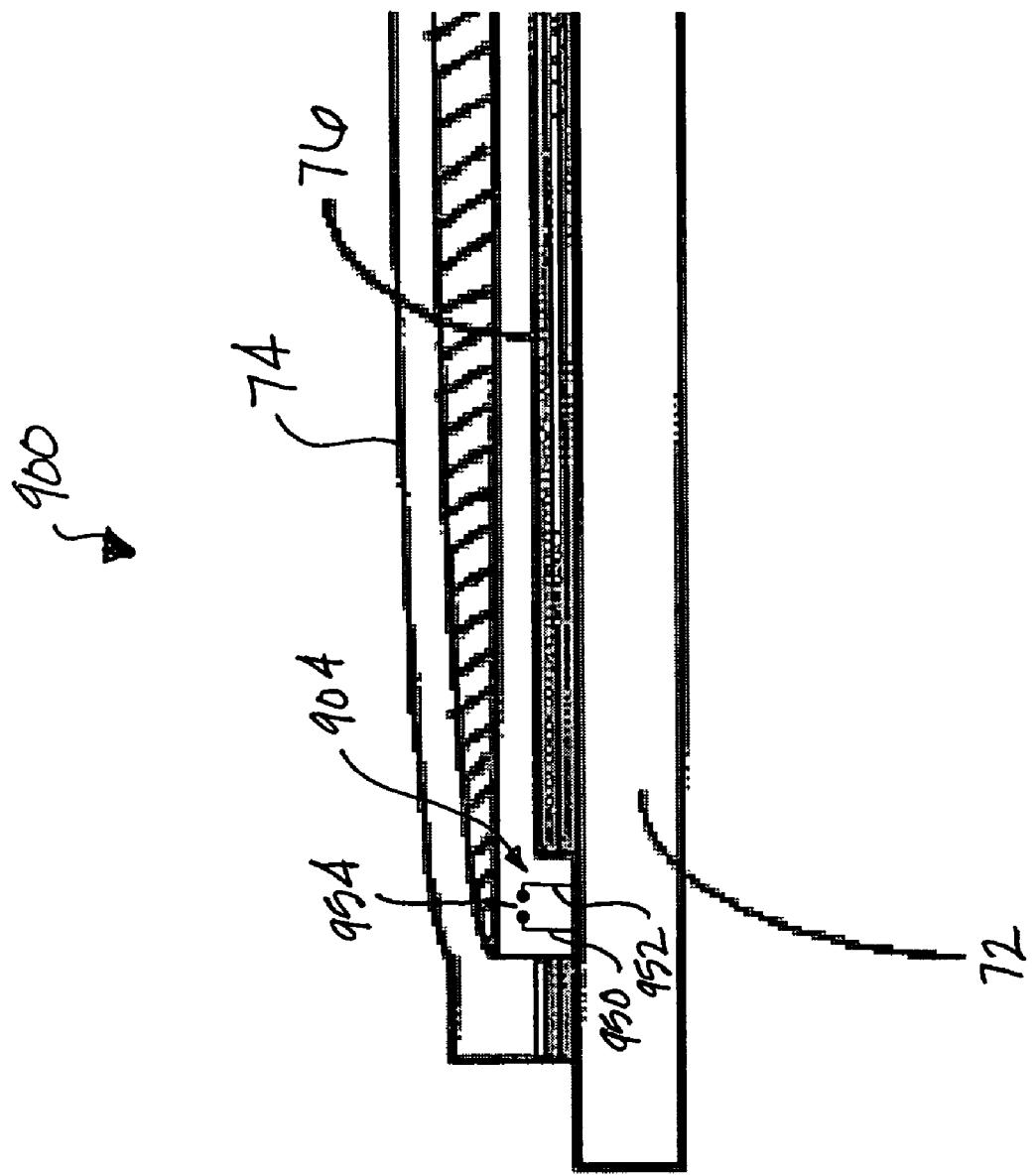
FIG. 9B is a partial cross section view of one embodiment of a MEMS display device packaging structure including a water vapor sensor configured to sense the presence of water vapor above a predefined level.

In another embodiment, a display device includes a water vapor sensor within the display packaging structure, as illustrated in FIGS. 9A-B. FIG. 9A is a block diagram of one embodiment of a display device with a water vapor sensor 904, wherein the water vapor sensor 904 is coupled to a sensor circuit 906, which is coupled to a processor 908. The water vapor sensor 904 may be any sensor known in the art. An exemplary water vapor sensor is discussed in more detail in reference to FIG. 9B. The processor 908 may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 908 may be configured to execute one or more software modules. In addition to executing an operating system, the processor may be configured to execute one or more software applications, including a web browser, a telephone application, an email program, or any other software application.

The water vapor sensor 904 is configured to detect the presence of water vapor in the display device package structure in excess of a predefined level in combination with the sensor circuit 906. The sensor circuit 906 is configured to transmit a detection signal to the processor 908 in response to detection of water vapor at the water vapor sensor 904 above a predefined level. In certain embodiments, the water vapor sensor 904 is configured to detect a specific amount of water vapor in addition to the presence of water vapor of a predefined level, such that the water vapor sensor 904 and sensor circuit 906 are configured to determine whether water vapor in the display device packaging structure is above a plurality of predefined levels. Accordingly, the sensor circuit 906 is configured to transmit an appropriate detection signal to the processor 908 corresponding to the level of water vapor sensed in the display device packaging structure.

In one embodiment, the processor 908 is also configured to communicate with an array controller 910. In one embodiment, the array controller 910 includes a row driver circuit 912 and a column driver circuit 914 that provide signals to a pixel array 916 of a MEMS display. In response to a detection signal from the sensor circuit 906, the processor is configured to activate the pixel array 916 to display an end-of-life image by transmitting an appropriate signal to the array controller 910. Activated pixels of the array 916 will remain in the active state without continued activation via the array controller 910 in the presence of sufficient water vapor as detected by the water vapor sensor 904, and the end-of-life image will remain substantially permanent.

In one embodiment, the processor 908 is further configured to store information input by the user in memory, such as a flash memory or a programmable read only memory (PROM), in response to a detection signal from the sensor circuit 906. For example, where the display device is a telephone, the processor may be configured to store the telephone numbers previously input by the user in a flash memory or EEPROM. In addition, the end-of-life image may include a message indicating that the user's information has been stored.

In the embodiment where the water vapor sensor 904 is configured to detect the presence of different levels or amounts of water vapor according to a plurality of predefined levels, the device may be configured to display a different image depending on the predefined level of water vapor that is exceeded. For example, the display device may be configured to display a first image when a first predefined level of water vapor is exceeded, such as "THE LIFE OF YOUR DISPLAY WILL END IN 3 DAYS: TIME TO BUY A NEW PHONE", a second image when a second predefined level of water vapor is exceeded, such as "THE LIFE OF YOUR DISPLAY WILL END IN 1 DAY", and a third, end-of-life image when a third predefined level of water vapor is exceeded. The third, end-of-life image will remain visible on the display in the absence of continued activation of the display due to the presence of excessive water vapor and corresponding adherence of the movable layers of activated MEMS elements to their corresponding fixed layers. In some embodiments, the processor 908 may be configured to facilitate display of a user prompt to store information in response to receipt of a detection signal from the sensor circuit 906, such as "Your Display is going to die in 3 days: store numbers?"

In certain embodiments, the display device may be configured to send and receive messages or images in response to detection of a predefined level of water vapor in the display device package structure. In one embodiment, the display device may be configured to display advertising messages from a manufacturer with regard to prices of new devices in response to detection of a predefined level of water vapor. For example, in response to detection of a predefined level of water vapor, the device may be configured to notify a device manufacturer or service provider which sends an advertisement with respect to devices for sale in response to the notification. The display device is further configured to display the advertisement received from the manufacturer or service provider to the user.

FIG. 9B is a partial cross section view of a display device packaging structure with an exemplary water vapor sensor 904. The water vapor sensor 904 illustrated in FIG. 9B comprises two conductive members 950, 952 with an air gap 954 between the conductive members 950, 952. In the absence of water vapor, the resistance between the conductive members 950, 952 is substantially infinite. However, as the level of water vapor in the display packaging structure increases, thereby increasing the amount of water vapor between the conductive members 950, 952, the resistance between the conductive members 950, 952 decreases corresponding to the amount of water vapor present. The sensor circuit 906 may be outside the enclosed packaging structure or within the packaging structure. As will be appreciated by those skilled in the art, the water vapor sensor described is exemplary in nature and other sensors are within the scope of the invention.

In another embodiment of a MEMS display device with an end-of-life phenomenon, the operational lifetime of the display is predetermined according to properties of the device and packaging. The operational lifetime of the display may be determined based on the maximum water vapor presence at which the movable layer of a MEMS element will still be separable from its corresponding fixed layer without continued activation. In one embodiment, the operational lifetime of the display may be determined based at least in part on the absorption capacity of a desiccant included in the display packaging structure and expected permeation rate of water vapor into the packaging structure. In one embodiment, data representing the operational lifetime of a display is stored in a memory coupled to a processor, such as the processor 21 of FIG. 2, wherein the processor is configured to determine when the predetermined lifetime has expired. In response to determining the expiration of the display's lifetime, the processor is configured to coordinate activation of the display such that a predefined image is displayed to the user. In one embodiment, the processor is further configured to determine when the current life of the MEMS display is within a predefined range of the predetermined lifetime, and coordinate activation of the display so as to display a warning image in response to determining that the current life the MEMS display is within the predefined range of the predetermined lifetime.

Figure 10:
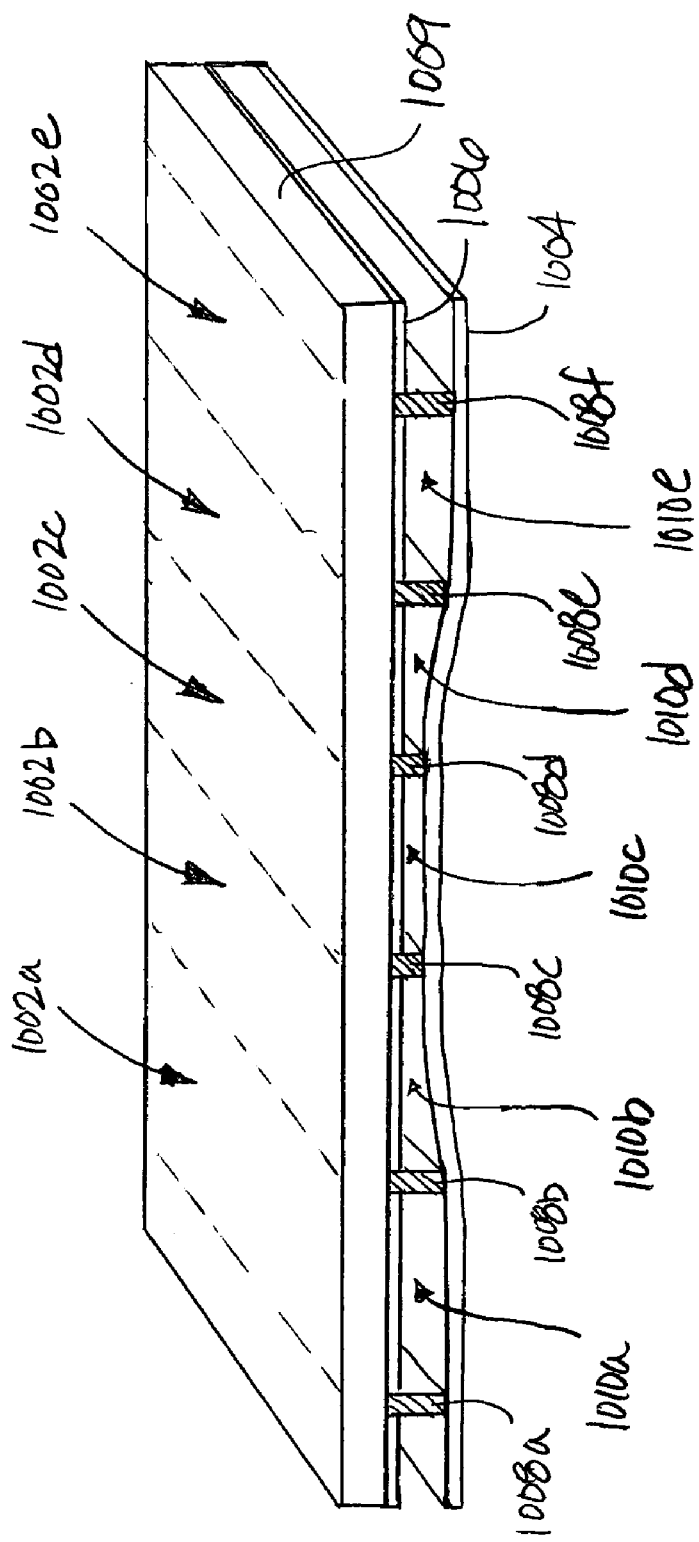
FIG. 10 is an isometric view depicting a portion of one embodiment of MEMS display in which the cavity height in preselected MEMS elements are smaller than the cavity heights of unselected MEMS elements.

In yet another embodiment of a MEMS display device with an end-of-life phenomenon, individual MEMS elements of the MEMS display have differing cavity heights. The depicted portion of the MEMS array in FIG. 10 includes five adjacent MEMS elements 1002a-e. The MEMS elements 1002a-e comprise a mechanical or movable layer 1004 and an electrically conductive fixed layer 1006, wherein the movable layer 1004 is positioned on top of posts 1008a-f and the conductive fixed layer 1006 is formed on a substrate 1009. The movable layer 1004 and fixed layer 1006 form cavities 1010a-e for each respective MEMS element 1002a-e. As illustrated in FIG. 10, the posts 1008a-f have differing heights, and thereby the respective cavities 1010a-e for each MEMS element 1002a-e have a different height. For the MEMS elements 1002b-d with a reduced cavity height, the mechanical or movable layer 1004 will remain adhered to the fixed layer 1006 in the presence of less water vapor than the MEMS elements 1002a, e with a greater cavity height. Thus, an image will be displayed on the MEMS display according to the MEMS elements with a reduced cavity height in the presence of sufficient water vapor.

Figure 11:
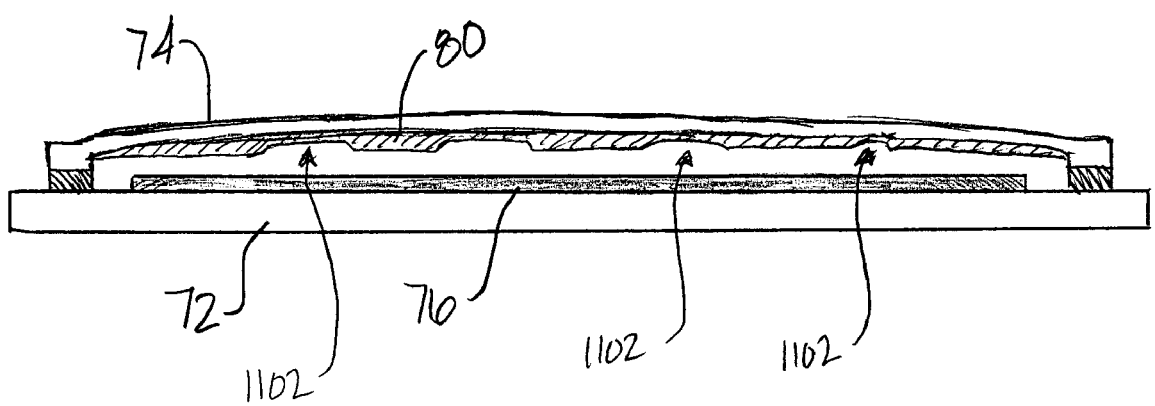
FIG. 11 is a cross section of one embodiment of a MEMS display device packaging structure including areas of reduced desiccant.

In an additional embodiment of a MEMS display device with an end-of-life phenomenon, the display device packaging structure includes a desiccant with varied degrees of absorbent capacity across its surface. FIG. 11 is a cross section view of one exemplary implementation of a display device package structure with a varied desiccant 80. Elements similar to those illustrated in FIG. 7 and described in reference thereto are labeled with corresponding reference numerals. As illustrated in FIG. 11, the desiccant 80 is applied to the backplane 74 of the packaging structure, wherein the desiccant 80 includes preselected areas 1102 having substantially less desiccant 80 than other unselected areas. MEMS elements of the display device 76 located proximate to the preselected areas 1102 will remain in a permanently active state, wherein the movable layer adheres to the fixed layer, in the presence of sufficient water vapor in the packaging structure due to the reduced desiccant 80, whereas the MEMS elements proximate the unselected areas of the desiccant 80 will remain operational because the desiccant 80 has retained the water vapor in those areas. Accordingly, a predefined image will be displayed on the MEMS display device 76 according to the MEMS elements in the preselected areas 1102. As will be appreciated by those skilled in the art, the preselected areas of the desiccant may include no desiccant, or desiccant with a reduced absorption capacity in comparison to the desiccant in the unselected areas.

In another embodiment of a MEMS display device configured for an end-of-life phenomenon, a user can apply a temperature differential to a surface of the display package, such as extreme cold or heat, thereby causing movement of water vapor molecules in the display device packaging structure proximate areas where the temperature differential is applied. The temperature differential can be applied, for example, with a cold or hot tipped stylus to the surface of the display, wherein an image is displayed according to the areas where the stylus is applied. The generated effect is similar to that of novelty devices wherein a magnetic stylus is applied to a surface of a screen containing metallic filaments, such that the metallic filaments are attracted to the surface of the screen according to the application of the magnetic stylus to display an image. Thus, when a hot-tipped stylus is used, the MEMS elements that are contacted are released to a reflective or white state, and when a cold-tipped stylus is used, the MEMS elements that are contacted are stuck in an activated or black state.

Figure 12A:
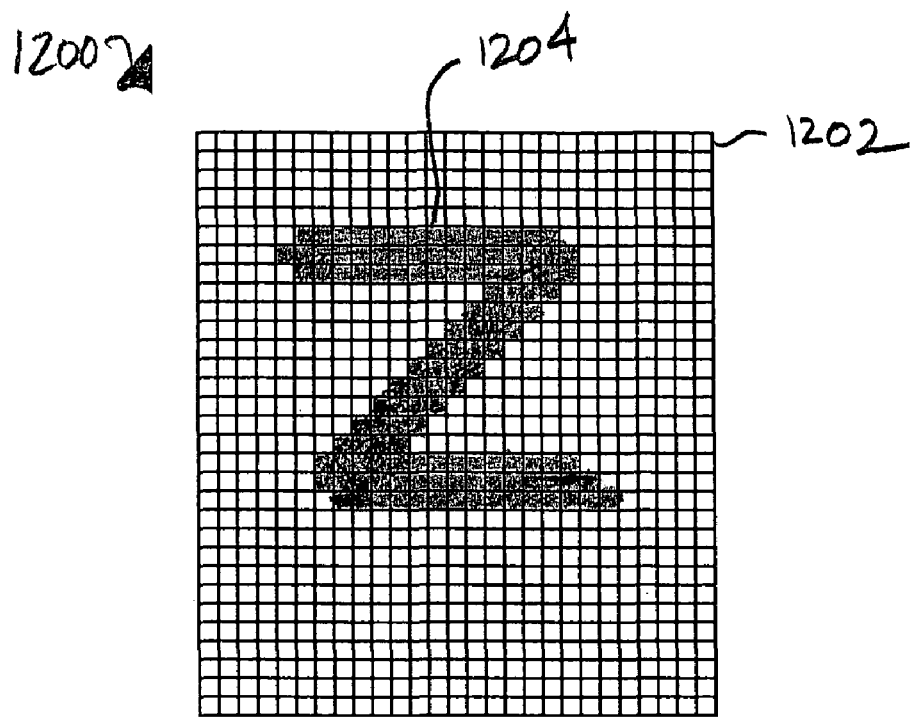
FIG. 12A is an illustration of one embodiment of a display wherein a reduced temperature has been applied such that an end-of-life image is displayed.

One embodiment of a method of activating an end-of-life phenomenon comprises applying extreme cold or reduced temperature to selective areas of a surface of the display, using a cold or cold-tipped stylus for example. FIG. 12A is an exemplary illustration of a MEMS display 1200 comprising a plurality of MEMS elements 1202, wherein a reduced temperature has been applied to selective areas 1204. Application of the reduced temperature generates condensation of water vapor molecules present in the MEMS display device package at the selective areas 1204 where the reduced temperature is applied. In certain embodiments, the amount of water vapor present in the MEMS display device package is sufficient to further actuate or maintain MEMS elements in an activated position at the selected areas, such that an image is displayed at the selected areas 1204 as illustrated in FIG. 12A.

The method may further comprise activating the display to actuate the movable layers of a plurality of MEMS elements, and then de-activating the display to move the movable layers of a plurality of MEMS elements to a released state. Due to the condensation of water vapor molecules at the selected areas 1204, the MEMS elements in the selected areas 1204 will remain in an actuated position without continued activation, thereby displaying an image on the MEMS display at the selected areas, as illustrated in FIG. 12A for example. In some embodiments, the display may be further activated to clear the display of the image.

Figure 12B:
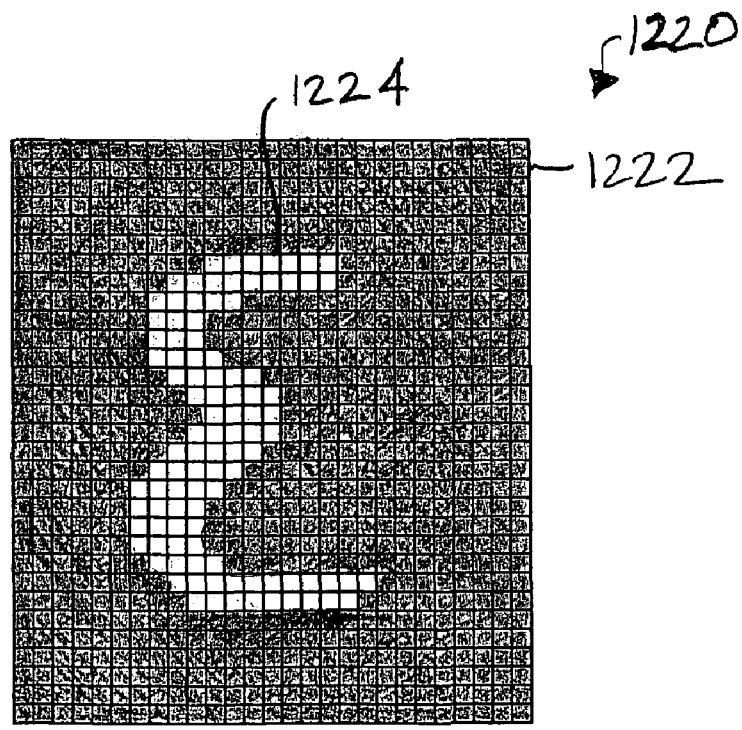
FIG. 12B is an illustration of one embodiment of a display wherein an increased temperature has been applied such that an end-of-life image is displayed.

Another embodiment of a method of activating an end-of-life phenomenon comprises applying heat or increased temperature to selective areas of a surface of the display, using a hot or hot-tipped stylus for example. Application of increased temperature to the display generates evaporation of water vapor molecules present in the MEMS display device package at the selected areas where the increased temperature is applied. FIG. 12B is an exemplary illustration of a MEMS display 1220 comprising a plurality of MEMS elements 1222, wherein an increased temperature has been applied to selective areas 1224 of the display which has reached the end of its operational lifetime. In one embodiment, the MEMS display device has already reached the end of its operational lifetime due to the presence of sufficient water vapor in the MEMS display device package, wherein a plurality of the MEMS elements of the display remain in an activated or actuated state without continued activation. In certain embodiments, substantially all of the MEMS elements are in an activated state without continued activation, as illustrated in FIG. 12B. When a user applies an increased temperature difference to the selective areas 1224 of the display 1220, the MEMS elements at the selected areas 1224 move to a released state as the water vapor retaining the movable membrane in the activated state evaporates in response to the increased temperature application. As illustrated in FIG. 12B, the MEMS elements at the selected areas 1224 are in a released state while MEMS elements in unselected areas remain in an activated state, thereby displaying an image according to the selected areas 1224.

In certain embodiments, the method may include detecting a predefined level of water vapor within the MEMS display device package and notifying a user that the display is near the end of its operable lifetime. The user may then apply the reduced temperature to display an image at selected areas of the display as discussed above. Alternatively, in response to notification that the display is near the end of its operable lifetime, the user may activate the display when sufficient water vapor is present in the display package such that a plurality of MEMS elements remain in an activated position without continued activation. The user may then apply an increased temperature to selective areas of the display such that the MEMS elements at the selected areas are "released" to a released state, thereby displaying an image on the display according to the selected areas. In additional embodiments, a user may intentionally contact the MEMS display with water vapor as discussed above with respect to other embodiments of the invention. In addition, the method may further comprise activation of the display to clear the image.

As discussed above, a MEMS display device has a significant tolerance for water vapor, wherein the display will continue to operate in the presence of a significant level of water vapor as compared to other display devices such as OLED's. It is generally known that OLED displays have significant environmental constraints on the amount of water and oxygen present both during assembly and inside the final package display. In contrast, embodiments of MEMS displays do not mandate an inert, vacuum or dry environment during assembly or operation. Thus, MEMS displays tolerate exposure to significant levels of water vapor before reaching a non-operational state, whereas an OLED display device has substantially zero tolerance for the presence of water vapor and the entirety of an OLED display will be non-operational once exposed to a small level of water vapor. The ability of MEMS display elements to tolerate the presence of water vapor and remain operational allows for the implementation of the above-described embodiments of display devices with end-of-life phenomena.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method of displaying an image on a microelectromechanical system (MEMS) display, comprising:
   receiving water vapor in a MEMS display;
   receiving user input to activate the display; and
   displaying a predefined image on the display in response to activation, wherein the presence of water vapor allows the image being displayed without continued activation.

2. The method of claim 1, wherein the predefined image comprises at least one of a user selected image and a prestored image.

3. The method of claim 1, wherein displaying the predefined image comprises displaying at least one of text and one or more graphics.

4. The method of claim 1, wherein receiving water vapor comprises receiving water vapor through an opening in a packaging structure of the MEMS display, and wherein the opening is configured to expose the MEMS display to ambient conditions.

5. The method of claim 1, wherein the MEMS display is encapsulated within a MEMS display package, and wherein the method further comprises detecting water vapor above a predefined level in the MEMS display package.

6. The method of claim 5, wherein detecting water vapor above the predefined level comprises detecting water vapor above a plurality of predefined levels.

7. The method of claim 5, wherein the predefined image comprises at least one of text and one or more graphics.

8. The method of claim 5, wherein the predefined image comprises at least one of a user selected image and a prestored image.

9. The method of claim 5, wherein the MEMS display is an interferometric modulator display.

10. A microelectromechanical system (MEMS) display device, comprising:
    a MEMS display encapsulated within a package; and
    a water vapor sensor within the package and coupled to the MEMS display,
    wherein the water vapor sensor is configured to sense water vapor in the package above a predefined level,
    wherein the MEMS display is configured to be activated by a user and configured to display a predefined image, and
    wherein the presence of water vapor in the package above the predefined level results in display of the predefined image without continued activation of the MEMS display.

11. The MEMS display device of claim 10, wherein the predefined image comprises at least one of text and one or more graphics.

12. The MEMS display device of claim 10, wherein the water vapor sensor is configured to sense water vapor in the package above a plurality of predefined levels and generate the display of a different predefined image in response to sensing the presence of water vapor in the package above each of the predefined levels.

13. The MEMS display device of claim 12, wherein at least a first predefined image displayed in response to sensing a first predefined level of water vapor indicates a remaining lifetime of the display device.

14. The MEMS display device of claim 10, wherein the predefined image comprises at least one of a user selected image and a prestored image.

15. The MEMS display device of claim 10, wherein the MEMS display device is configured to store information input by a user to a flash memory in response to sensing water vapor above a predefined level.

16. The MEMS display device of claim 10, wherein the MEMS display is an interferometric modulator display.

17. The MEMS display device of claim 10 further comprising:
    a processor in electrical communication with said MEMS display, said processor configured to process image data; and
    a memory device in electrical communication with said processor.

18. The MEMS device of claim 17 further comprising a driver circuit configured to send at least one signal to said MEMS display.

19. The MEMS device of claim 18 further comprising a controller configured to send at least a portion of said image data to said driver circuit.

20. The MEMS device of claim 17 further comprising an image source module configured to send said image data to said processor.

21. The MEMS device of claim 20, wherein said image source module comprises a receiver or a transmitter.

22. The MEMS device of claim 17 further comprising an input device configured to receive input data and to communicate said input data to said processor.

23. The method of claim 1 further comprising:
    storing data representing a predetermined lifetime of the MEMS display in memory coupled to control circuitry configured to control operation of the display; and
    determining when the predetermined lifetime of the MEMS display has expired.

24. The method of claim 23 further comprising determining when the current life of the MEMS display is within a predefined range of the predetermined lifetime, and displaying a warning image in response to determining that the current life the MEMS display is within the predefined range.

25. The method of claim 23 further comprising activating a plurality of MEMS elements of the MEMS display.

* * * * *

UNITED STATES PATENT AND TRADEMARK OFFICE
CERTIFICATE OF CORRECTION

| | | |
|---|---|---|
| PATENT NO. | : 7,916,103 B2 | Page 1 of 1 |
| APPLICATION NO. | : 11/102543 | |
| DATED | : March 29, 2011 | |
| INVENTOR(S) | : Lauren Palmateer | |

It is certified that error appears in the above-identified patent and that said Letters Patent is hereby corrected as shown below:

Title Page (Item 57), Abstract, Line 6, Change "he" to --be--.

Page 3 (Item 56), Column 1, Line 23, Under U.S. Patent Documents, change "Jr." to --Jr., deceased--.

Column 1, Line 26, Change "and or" to --and/or--.

Column 3, Line 2, After "life" insert --of--.

Column 4, Line 35, After "OF" delete "THE".

Column 7, Line 34, Change "respectively" to --respectively.--.

Column 14, Line 1, After "life" insert --of--.

Column 18, Line 36, In Claim 24, after "life" insert --of--.

Signed and Sealed this
Eleventh Day of October, 2011

David J. Kappos
*Director of the United States Patent and Trademark Office*